(12) United States Patent
Shand et al.

(10) Patent No.: US 9,300,941 B2
(45) Date of Patent: Mar. 29, 2016

(54) STEREOSCOPIC VIDEO SIGNAL PROCESSOR WITH ENHANCED 3D EFFECT

(75) Inventors: Mark Shand, Dampierre en Yvelines (FR); Guillaume Etorre, Paris (FR)

(73) Assignee: ZORAN (FRANCE) S.A., Neuilly-Sur-Seine (FR)

( * ) Notice: Subject to any disclaimer, the term of this patent is extended or adjusted under 35 U.S.C. 154(b) by 748 days.

(21) Appl. No.: 13/638,034

(22) PCT Filed: Nov. 24, 2010

(86) PCT No.: PCT/EP2010/068143
§ 371 (c)(1),
(2), (4) Date: Sep. 28, 2012

(87) PCT Pub. No.: WO2011/120601
PCT Pub. Date: Oct. 6, 2011

(65) Prior Publication Data
US 2013/0033570 A1    Feb. 7, 2013

Related U.S. Application Data

(60) Provisional application No. 61/320,594, filed on Apr. 2, 2010.

(51) Int. Cl.
*H04N 13/00* (2006.01)
*H04N 13/04* (2006.01)
(52) U.S. Cl.
CPC ....... *H04N 13/0029* (2013.01); *H04N 13/0048* (2013.01); *H04N 13/0497* (2013.01)
(58) Field of Classification Search
None
See application file for complete search history.

(56) References Cited

U.S. PATENT DOCUMENTS

2008/0309756 A1    12/2008   Verburgh et al.
2009/0009590 A1    1/2009    Russell et al.
(Continued)

FOREIGN PATENT DOCUMENTS

EP    1592264 A4    4/2006

OTHER PUBLICATIONS

International Search Report and Written Opinion from International Application No. PCT/EP2010/068143 dated Feb. 28, 2011.

*Primary Examiner* — Sath V Perungavoor
*Assistant Examiner* — Dakshesh Parikh
(74) *Attorney, Agent, or Firm* — The Marbury Law Group, PLLC

(57) ABSTRACT

An input stereoscopic video signal has a first frame sequence ($S_L$) in a left-eye channel and a second frame sequence ($S_R$) in a right-eye channel, the second frame sequence ($S_R$) having a zero or non-zero time offset $\tau 1$ with respect to the first frame sequence ($S_L$). It is converted into an output stereoscopic video signal having a third frame sequence ($S'_L$) in the left-eye channel and a fourth frame sequence ($S'_R$) in the right-eye channel. The fourth frame sequence ($S'_R$) has a zero or non-zero time offset $\tau 2$ with respect to the third left-eye frame sequence ($S'_L$). The two time offsets $\tau 1, \tau 2$ may be different $\tau 2 \neq \tau 1$), in which case the conversion comprises a time interpolation of the frames of at least one of the first and second frame sequences with interpolation parameters selected to apply a relative time shift of $\tau 2 - \tau 1$ to the right-eye channel with respect to the left-eye channel.

8 Claims, 1 Drawing Sheet

(56) References Cited

U.S. PATENT DOCUMENTS

2010/0053306 A1* 3/2010 Hirasawa ........... H04N 13/0048
   348/43

2010/0238274 A1* 9/2010 Kim ................... H04N 13/0018
   348/51

2011/0285815 A1* 11/2011 Kervec ............... H04N 13/0003
   348/43

* cited by examiner

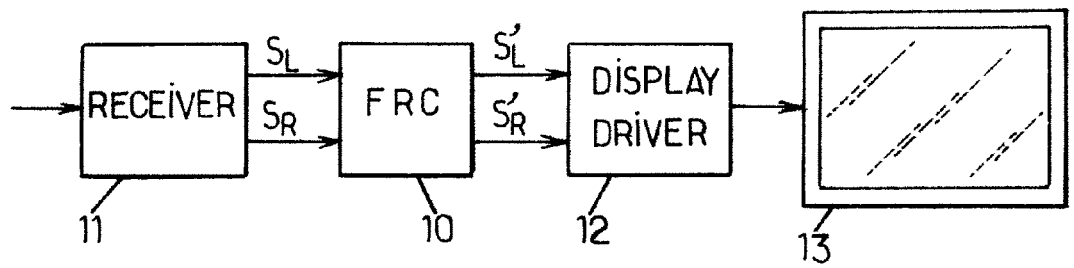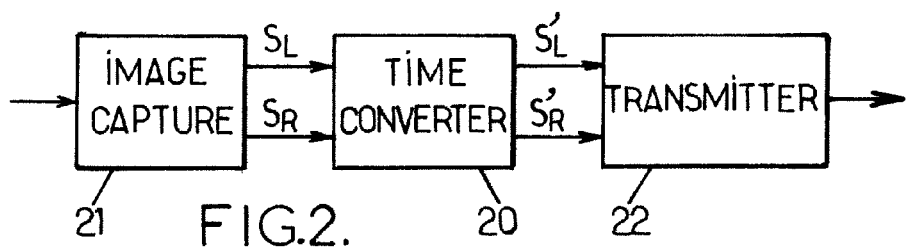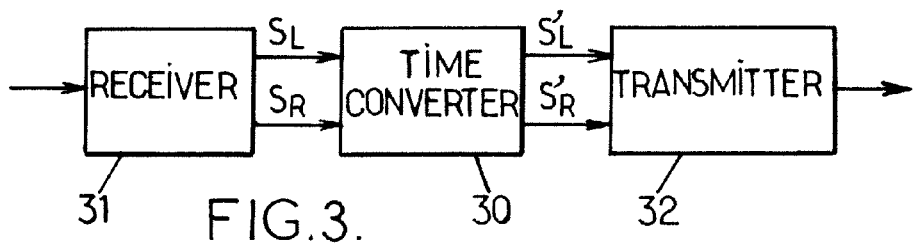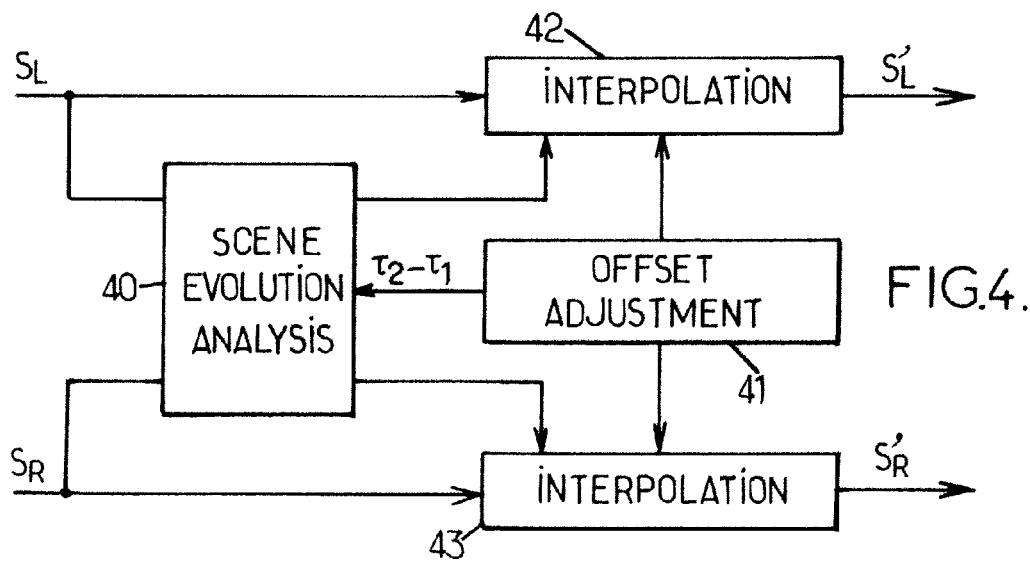

STEREOSCOPIC VIDEO SIGNAL PROCESSOR WITH ENHANCED 3D EFFECT

BACKGROUND OF THE INVENTION

The present invention relates to the processing of digital stereoscopic video signals with accurate rendering of three-dimensional (3D) effects.

In the stereoscopic three-dimensional viewing of a scene, distinct but similar images are presented to the left and right eyes. Disparities between the observed left and right images act as depth cues to the human visual system (HVS), creating the illusion of depth in the perceived image when the HVS combines the left eye and right eye images in the visual cortex. Extending this idea to video, when a time varying sequence of left-eye images and right-eye images is rapidly presented with appropriate disparities between corresponding left-eye and right-eye images, an illusion of depth in a moving scene can be created.

Various stereoscopic 3D display technologies exist, or can be envisaged, that present over a given time period a sequence of correlated image pairs to the left and right eyes.

In some stereoscopic 3D display technologies isolated images are displayed separately to the left and right eyes using independent display systems for instance using head-mounted displays. In general, such systems are only suitable for a single viewer.

In some technologies, the left-eye and right-eye images are displayed simultaneously by being merged into a single image seen by both eyes. Filters respectively placed in front of the two eyes then extract the relevant images from the merged image. The extraction of the images intended for the left and right eyes can be based on frequency separation, like in the so-called Dolby-3D system. Another technology uses different polarization states for the two eyes, like in the so-called RealD system.

On the other hand, in frame-sequential 3D systems, images intended for the left eye are displayed at one time and images intended for the right eye are displayed at another time. The display system alternates between the display of left-eye and right-eye images. During the display of the left-eye image, the path to the right eye is blocked and likewise during the display of the right-eye image, the path to the left eye is blocked. Thus, each eye sees its intended image sequence and sees blackness when an image intended for the other eye is being displayed. For maximum viewer comfort, the system alternates between image and blackness at a sufficiently high rate such that the viewer does not perceive flicker.

In such frame-sequential 3D systems, the blocking of light may be achieved by active eyewear, for example eyewear embedding a pi-cell (optically compensated bend mode LCD surface mode device with parallel rub direction) into each lens of the eyewear. The pi-cell is alternately switched between clear and opaque, synchronously to the frame rate of the television set. Therefore, if the TV alternately supplies left-eye and right-eye images, the active eyewear can steer the corresponding image to each eye, creating the 3D stereoscopic effect.

Alternatively, in another type of frame-sequential 3D system, the blocking may be achieved by passive eyewear incorporating polarizing filters and a switchable polarizer on the display device that can be switched between two opposed polarization states.

Thus, stereoscopic display systems can generally be categorized as (1) simultaneous-type, i.e. a left-eye image and a right-eye image are displayed at the same instant, or (2) staggered-type, i.e. the display shows a left-eye image followed by a right-eye image followed by a left-eye image, etc.

Likewise, two types of video recording apparatus can be distinguished. The first type of apparatus shoots two images at the same time for the left and right eyes, for example using two separate optics spaced apart to account for the stereo effect and supplying incoming light to two respective sensors sampled simultaneously. In the other type, the left-eye and right-eye images are captured at different times, for example using a single light sensor and a prism or mirror in the optical path to switch back and forth between two viewpoints providing the stereo effect. When the 3D video is made of synthesized images, the left-eye and right-eye images are generally built as representations of a 3D scene at the same instant.

Due to the various technologies used for generating and displaying stereoscopic video signals, there can be a slight discrepancy in the time sampling structure between capture and display. For an image sequence representing a static scene, the different time sampling structures between the left and right image sequences create no problem. For a dynamically changing scene, the movement of objects within the scene is slightly changed. However, the perception of movement by the viewer is almost unaffected because the fluctuation in the object speeds is hardly noticeable at the usual frame rates of video contents.

It would be desirable to optimize the rendering of 3D effects in stereoscopic video applications, which is currently based on spatial disparities between the left-eye and right-eye image sequences.

SUMMARY OF THE INVENTION

A method of processing stereoscopic video signals is proposed, comprising:
  receiving an input stereoscopic video signal comprising a first frame sequence in a left-eye channel and, in a right-eye channel, a second frame sequence having a zero or non-zero time offset $\tau_1$ with respect to the first frame sequence; and
  converting the input stereoscopic video signal into an output stereoscopic video signal comprising a third frame sequence in the left-eye channel and, in the right-eye channel, a fourth frame sequence having a zero or non-zero time offset $\tau_2$ with respect to the third left-eye frame sequence, with $\tau_2 \neq \tau_1$.

The conversion into the output stereoscopic video signal comprises a time interpolation of the frames of at least one of the first and second frame sequences with interpolation parameters selected to apply a relative time shift of $\tau_2-\tau_1$ to the right-eye channel with respect to the left-eye channel.

The time interpolation can be applied to the frames of one of the first and second frame sequences or both depending on the implementation. In an embodiment, the interpolation parameters are selected to apply a time shift of $(\tau_2-\tau_1)/2$ to the right-eye channel and a time shift of $(\tau_1-\tau_2)/2$ to the left-eye channel.

The third and fourth frame sequences may have a frame rate different from that of the first and second frame sequences, in particular when the display uses a higher frame rate than the input video signal. The time interpolation of the conversion into the output stereoscopic video signal is then advantageously performed as part of a frame rate conversion process.

The present inventors have realized that when handling stereoscopic video signals, referring to a time sampling structure for display which is different from the time sampling structure used for generating the left-eye and right-eye frame sequences can cause artifacts in the perception of depth when the scene includes fast moving objects, unless special measures are taken. Even if the perception of speed is unaffected by a change of time reference, there is an impact on the disparities between the observed left and right images which may give rise to strange 3D effects, particularly if there are both fast moving objects and static or slow moving objects in the scene.

To illustrates this, consider an example where the stereoscopic video signal was generated with a time offset of zero between the left-eye and right-eye frame sequences ($\tau_1=0$) and is displayed with the right-eye frame sequence delayed by $\tau_2>0$ with respect to the left-eye frame sequence to account for the technology and frame refresh rate of the display device. Then, an object moving from left to right will have an increased disparity on the display and will thus be perceived as closer than it actually is, while an object moving to the left will have a lower disparity and will look farther away. Objects having opposite speeds, or a fast moving object versus a static background, thus give rise to artifacts in the 3D rendering. The processing method avoids such depth artifacts by realigning the time sampling structures on the input and output sides.

The processing method can be applied in a stereoscopic video display if the technology that it uses to provide the 3D effect relies on a time sampling structure different from the one which was used to generate or transmit the 3D content. The method can also be applied on the recording side or by a broadcaster if the stereoscopic camera system samples the 3D scene with a time reference different from the one intended for display or required for transmission to receivers/displays of an unknown type.

The time offset $\tau_2$ in the output stereoscopic video signal is often known a priori. It may be fixed by the stereoscopic technology and the frame rate used in the display device, or set by some standard for transmission of stereoscopic video signals over networks or media. On the other hand, the time offset $\tau_1$ in the input stereoscopic video signal can be unknown because details of the source of the signal are often unavailable on the display side. However, $\tau_1$ may be detected by a suitable analysis of the input stereoscopic video signal. The processing method then comprises: detecting the time offset $\tau_1$ by analyzing the first and second frame sequences; and determining the relative time shift of $\tau_2-\tau_1$ based on the detected time offset $\tau_1$ and a predetermined time offset $\tau_2$. There are different ways of detecting the time offset $\tau_1$. A convenient one comprises: comparing at least one frame of the first frame sequence with at least one frame of the second frame sequence to identify directions of regularity between said frames; and detecting a non-zero time offset $\tau_1$ when non-horizontal directions of regularity are identified while $\tau_1=0$ is decided when only horizontal directions of regularity are identified.

Another aspect of the invention relates to a stereoscopic video signal processor, comprising:

- an input for receiving an input stereoscopic video signal comprising a first frame sequence in a left-eye channel and, in a right-eye channel, a second frame sequence having a zero or non-zero time offset $\tau_1$ with respect to the first frame sequence;
- an output for delivering an output stereoscopic video signal comprising a third frame sequence in the left-eye channel and, in the right-eye channel, a fourth frame sequence having a zero or non-zero time offset $\tau_2$ with respect to the third left-eye frame sequence, with $\tau_2 \neq \tau_1$; and
- a converter for producing the output stereoscopic video signal based on the input stereoscopic video signal.

The converter is arranged to perform time interpolation of the frames of at least one of the first and second frame sequences with interpolation parameters selected to apply a relative time shift of $\tau_2-\tau_1$ to the right-eye channel with respect to the left-eye channel.

Other features and advantages of the method and apparatus disclosed herein will become apparent from the following description of non-limiting embodiments, with reference to the appended drawings.

BRIEF DESCRIPTION THE DRAWINGS

FIGS. 1-3 are diagrams showing a stereoscopic video signal processor according to the invention used in three different kinds of environment.

FIG. 4 is a block diagram showing an exemplary embodiment of the stereoscopic video signal processor.

DESCRIPTION OF PREFERRED EMBODIMENTS

FIG. 1 shows a stereoscopic video signal processor 10 used in a TV set. The expression "TV set" as used herein is quite general and meant to also encompass video projectors and head-mounted stereoscopic displays. A receiver front end 11 receives the input stereoscopic video signal which has been transmitted in a suitable format over a communication medium. The communication medium referred to here may include a telecommunication network and/or a storage medium such as an optical disc (DVD, Blu-Ray, . . . ), a magnetic or solid state hard drive, a magnetic tape, etc.

In the embodiment shown in FIG. 1, the receiver 11 extracts a left-eye frame sequence $S_L$ and a right-eye frame sequence $S_R$ from the input stereoscopic video signal and supplies them to the input of the processor 10. The processor 10 can advantageously be a frame rate converter (FRC) processor provided in the TV set. The left-eye and right-eye frame sequences $S_L$, $S_R$ are converted by the processor 10 and the converted sequences $S'_L$, $S'_R$ are provided to the displayed driver 12 which controls the active components of the display device 13 which displays the pixels of the video signal. As shown in FIG. 1, eyewear 14 can be used together with the display device 13 to provide to stereoscopic 3D effects for the viewer. As mentioned in the introduction, the eyewear 13 and the display device 13 may use different kinds of technology to provide the 3D effect.

In the embodiment shown in FIG. 2, the stereoscopic video signal processor 20 is used between an image capture system 21 and a transmitter 22. The image capture system 21 supplies the left-eye input frame sequence $S_L$ and the right-eye frame sequence $S_R$ of the input stereoscopic video signal to the processor 20 which is set to apply a time conversion according to the processing method disclosed herein. The image capture system 21 may be embodied with different technologies. In particular, it may include one or two optical systems (lenses+light sensors) to provide the two frame sequences $S_L$, $S_R$ of the input video signal.

The time conversion processor 20 converts the input stereoscopic video signal $S_L$, $S_R$ into an output signal whose left-eye and right-eye frame sequences are noted $S'_L$, $S'_R$. The output signal $S'_L$, $S'_R$ is fed to the transmitter 22 which transmits or broadcasts this signal. Again, the transmission may be via telecommunication networks and/or storage media as mentioned above.

The formats on the transmission medium may be in accordance the specification of a timing structure for the transmitted stereoscopic video signal. The timing structure typically includes a frame rate which may be one of a plurality of frame rates supported on the transmission medium. In this case, the time conversion processor 20 may apply an FRC process as in FIG. 1 if the output frame rate of the image capture system 21 is different. The timing structure required on the transmission medium may also include an offset value between the left-eye and right-eye frame sequences of the stereoscopic signal.

In the context of FIG. 3, the time conversion processor 30 is not used on the image capture side or on the image display side, but in some intermediate place through which the stereoscopic video signal transits. In this case, the input stereoscopic video signal $S_L$, $S_R$ is received through a receiver 31, converted by processor 30 and transmitted through a transmitter 32 which may be similar to the transmitter 22 of FIG. 2.

The general layout of the time conversion processor 10, 20, 30 may be that of an FRC component. There are many known methods for performing FRC.

In one method, a motion estimator unit forms an estimate of motion in the video by performing a block matching search, or similar spatial matching algorithm. The motion field is described by motion vectors, typically one or more candidated for each block (often 4×4 pixel, though other sizes are possible). The motion field is then smoothed using known techniques. Finally, vectors are assigned to individual pixels using a process known as dilation. Once the motion fine-scale motion field is known, an intermediate frame can be created by interpolating pixels along the direction of motion.

In another method, each image is first transformed, block by block, into the frequency domain using a Fourier transform. The phase information from each transform is then compared in a phase correlator. The peaks in the phase correlator correspond to motion occurring in the underlying blocks. Individual pixels within a block are then assigned to specific motions either derived from this phase correlation, or the phase correlation of neighboring blocks. This assignment is typically performed by dilation. Once the motion fine-scale motion field is known, an intermediate frame can be created by interpolating pixels along the direction of motion.

In a third method, a sparse set of candidate motion vectors is obtained using a heuristic method. Individual pixels in the underlying image are assigned to motion vectors using energies calculated from a series of L-norms. Once the motion fine-scale motion field is known, an intermediate frame can be created by interpolating pixels along the direction of motion.

The FRC technology can shift an image sequence in time by computing new intermediate images representing samples at intervening moments in time. Image statistics gathered in the process of FRC computation can be used to infer the temporal sampling structures of a sequence of stereoscopic image pairs.

An FRC process applied to a sequence of frames having a frame rate $F=1/T$ converts input frames at times $t$, $t+T$, $t+2T$, $t+3T$, . . . into output frames at times $t+\Delta t$, $t+\Delta t+T'$, $t+\Delta t+2T'$, $t+\Delta t+3T'$, . . . , the output sequence having a frame rate $F'=1/T'$. In addition to the conversion of the frame rate $F \rightarrow F'$ or frame interval $T \rightarrow T'$, a time shift $\Delta t \geq 0$ occurs.

The present invention can be implemented using any type of frame rate conversion method.

The FRC component looks for directions of regularity in the input frame sequence in order to associate each pixel of an output frame at time $t+\Delta t+kT'$ ($k \geq 0$) with one or more directions. The direction(s) associated with an output pixel are then used to interpolate the value of that output pixel. Different kinds of directional interpolation can be applied, as well as different methods for detecting the directions of regularity, as exemplified by the three methods mentioned above.

In the case of stereoscopic video signals, there are two frame sequences, one for the left eye having input frames at times $t_L$, $t_L+T$, $t_L+2T$, $t_L+3T$, . . . and one for the right eye having input frames at times $t_R$, $t_R+T$, $t_R+2T$, $t_R+3T$, . . . the frame rate $F=1/T$ is in principle the same for both channels. However, the time sampling reference $t_L$, $t_R$ may be different, the offset being designated as $\tau_1 = t_R - t_L$. If the input frames were acquired synchronously in the left-eye and right-eye channels, then $\tau_1 = 0$. Values $\tau_1 < 0$ result from the right-eye channel being sampled ahead of the left-eye channel, while values $\tau_1 > 0$ correspond to a delay in the sampling of the right-eye channel as compared to the left-eye channel.

When applied in parallel to a stereoscopic video signal, the FRC process yields output frames at times $t_L+\Delta t_L$, $t_L+\Delta t_L+T'$, $t_L+\Delta t_L+2T'$, $t_L+\Delta t_L+3T'$, . . . in the left-eye channel and output frames at times $t_R+\Delta t_R$, $t_R+\Delta t_R+T'$, $t_R+\Delta t_R+2T'$, $t_R+\Delta t_R+3T'$, . . . in the right-eye channel. Since the interpolation takes place in parallel in the two channels, we can select different values of the time shifts $\Delta t_L$, $\Delta t_R$ if needed.

In particular, this is helpful when the kind of technology relied on to display the video sequence assumes a time offset $\tau_2$ of the right-eye sequence with respect to the left-eye sequence such that $\tau_2 \neq \tau_1$, e.g. $\tau_2 = 0$ for a simultaneous-type of stereoscopic display or $\tau_2 = \pm T'/2$ for a staggered-type of stereoscopic display. In such a case ($\tau_2 \neq \tau_1$), the FRC parameters are adjusted such that $t_R + \Delta t_R = t_L + \Delta t_L + \tau_2$ or, in other words, a relative time shift $\Delta t_{R-L} = \Delta t_R - \Delta t_L = \tau_2 - \tau_1$ is applied to the right-eye frame sequence with respect to the left-eye frame sequence.

In the embodiment shown in FIG. 4, the FRC processor includes a scene evolution analyzer 40 which detects the directions of the regularity of the frames of the input sequences $S_L$, $S_R$. Here, a single analyzer 40 is shown because the scene evolution analysis can take advantage of the presence of two channels representing the same scene, albeit with some disparities. It would also be possible to provide a separate analyzer for each stereoscopic channel. The analyzer 40 provides directions of regularity for the pixels of the output sequences $S'_L$, $S'_R$ at the output sampling times $t_L + \Delta t_L + kT'$ and $t_R + \Delta t_R + kT'$, thus taking into account any difference $\tau_2 - \tau_1$ between the two time shift values $\Delta t_L$, $\Delta t_R$.

The relative time shift value $\tau_2 - \tau_1$ is provided by an offset adjustment unit 41. The detected directions of regularity are taken into account by the scene evolution analyzer 40 to identify the sampling instants of the two channels on the output side, and by respective interpolators 42, 43 which compute the pixel values of the left-eye and right-eye output frame sequences $S'_L$, $S'_R$. The interpolation weights used by the interpolators 42, 43 depend on the time shifts $\Delta t_L$, $\Delta t_R$ which are selected to apply the relative time shift $\tau_2 - \tau_1$ to the right-eye channel with respect to the left-eye channel.

For applying such time shifts $\Delta t_L$, $\Delta t_R$, different alternative ways are possible, for example:

applying no time shift to the left channel ($\Delta t_L = 0$) and the whole time shift $\Delta t_R = \tau_2 - \tau_1$ to the right channel;

applying no time shift to the right channel ($\Delta t_R = 0$) and a time shift $\Delta t_L = \tau_1 - \tau_2$ to the left channel;

balancing the relative time shift between the two channels, namely $\Delta t_R = (\tau_2 - \tau_1)/2$ and $\Delta t_L = (\tau_1 - \tau_2)/2$.

The latter option has the advantage of distributing the interpolated frames between the two stereoscopic channels. Otherwise, if the two frame rates $F$, $F'$ are multiple of each other (or $F = F'$), one of the output sequences $S'_L$, $S'_R$ contains more non-interpolated frames than the other, and that output sequence may be perceived as having a higher quality than the other sequence. It may be perceptually preferable to balance the slight degradation introduced by the interpolation process between the two stereoscopic channels.

In an embodiment, for determining the relative time shift to $\tau_2 - \tau_1$ to be applied between the right-eye and the left-eye channels, the offset adjustment unit 41 receives the values $\tau_1$, $\tau_2$ as settings determined in advance. For example, in a TV set (FIG. 1), the offset $\tau_2$ is generally known since it depends on the stereoscopic display technology and/or on display options selected by the user, and the offset $\tau_1$ may be known a priori as a parameter specified or implied by the video signal transmission format. Likewise, on the image capture side (FIG. 2), the timing structure of the image capture system 21 is generally known and sets the value of $\tau_1$, while $\tau_2$ may be a parameter imposed by the relevant formats on the transmission medium. In the case of an intermediate converter 30 (FIG. 3), the values of $\tau_1$ and $\tau_2$ can be set depending on the formats used upstream and downstream of the converter.

In situations where the time offset $\tau_1$ in the input stereoscopic video signal is not known, the conversion processor 10, 20, 30 may detect it by analyzing the two frame sequences $S_L$, $S_R$ of the input signal. This analysis for detecting $\tau_1$ can be part of the analysis carried out by the scene evolution analyzer 40. From a predetermined value of the time offset $\tau_2$ on the output side, the offset adjustment unit 41 can then determine the relative time shift $\tau_2 - \tau_1$ to be applied in the time conversion processor 10, 20, 30.

Different analysis methods can be used in order to detect the time offset $\tau_1$ in the input video signal. A convenient method consists in providing two corresponding frames from the left-eye channel and the right-eye channel, respectively, to the analyzer 40 in order to identify directions of regularity. A motion detection process based on these two frames yields vectors which denote stereoscopic disparities and, if the two frames are misaligned in time, some motion component. If the two frames were generated simultaneously ($\tau_1 = 0$), then there is a very strong probability that only horizontal vectors will be detected since the two frames differ only by the disparities between the left and right channels. If, on the other hand, motion vectors having significant vertical components are detected, the analyzer 41 can decide that $\tau_1 \neq 0$, which means, in general, that $\tau_1 = T/2$. This kind of test between the frames of the left-eye and right-eye channels can be performed once for a given program, or periodically (at a frequency much smaller than the frame rate) for more reliability. The test may be repeated if only horizontal vectors are detected since this may also be due to a 3D scene shot with $\tau_1 \neq 0$ but including only objects which mostly move horizontally.

It will be appreciated that the embodiments described above are illustrative of the invention disclosed herein and that various modifications can be made without departing from the scope as defined in the appended claims.

The invention claimed is:

1. A stereoscopic video signal processing method, comprising:
    receiving an input stereoscopic video signal comprising a first frame sequence in a first-eye channel and, a second frame sequence in a second eye channel having a first time offset $\tau_1$ with respect to the first frame sequence;
    comparing at least one first frame of the first frame sequence with at least one second frame of the second frame sequence to identify directions of regularity between the at least one first frame and the at least one second frame;
    detecting the first time offset $\tau_1$, wherein the first time offset $\tau_1$ is detected as being a non-zero time offset when the directions of regularity are non-horizontal and the first time offset $\tau_1$ is detected as being a zero time offset when the directions of regularity are only horizontal; and
    converting the input stereoscopic video signal into an output stereoscopic video signal comprising a third frame sequence in the first-eye channel and a fourth frame sequence in the second-eye channel having a second time offset $\tau_2$ with respect to the third frame sequence, with $\tau_2 \neq \tau_1$,
    wherein the conversion into the output stereoscopic video signal comprises a time interpolation of at least one of the first and second frame sequences with interpolation parameters selected to apply a relative time shift of $\tau_2 - \tau_1$ to the second-eye channel with respect to the first-eye channel.

2. The method of claim 1, wherein the interpolation parameters are selected to apply a first time shift of $(\tau_2 - \tau_1)/2$ to the second-eye channel and a second time shift of $(\tau_1 - \tau_2)/2$ to the first-eye channel.

3. The method of claim 1, wherein the third and fourth frame sequences have a frame rate different from that of the first and second frame sequences, wherein the time interpolation is performed as part of a frame rate conversion process.

4. The method as claimed in claim 1, further comprising:
    determining the relative time shift of $\tau_2 - \tau_1$ based on the detected first time offset $\tau_1$ and a predetermined value of the second time offset $\tau_2$.

5. A stereoscopic video signal processor, comprising:
    an input for receiving an input stereoscopic video signal comprising a first frame sequence in a first-eye channel and, in a second-eye channel, a second frame sequence having a first time offset $\tau_1$ with respect to the first frame sequence;
    a detector for detecting the first time offset $\tau_1$, wherein the detector is configured to compare at least one first frame of the first frame sequence with at least one second frame of the second frame sequence to identify directions of regularity between the at least one first frame and the at least one second frame, wherein the first time offset $\tau_1$ is detected as being a non-zero time offset when the directions of regularity are non-horizontal and the first time offset $\tau_1$ is detected as being a zero time offset when the directions of regularity are only horizontal;
    an output for delivering an output stereoscopic video signal comprising a third frame sequence in the first-eye channel and, in the second-eye channel, a fourth frame sequence having a second time offset $\tau_2$ with respect to the third frame sequence, with $\tau_2 \neq \tau_1$; and
    a converter for producing the output stereoscopic video signal based on the input stereoscopic video signal, wherein the converter is arranged to perform time interpolation of at least one of the first and second frame sequences with interpolation parameters selected to apply a relative time shift of $\tau_2 - \tau_1$ to the second-eye channel with respect to the first-eye channel.

6. The stereoscopic video signal processor of claim 5, wherein the interpolation parameters are selected to apply a first time shift of $(\tau_2 - \tau_1)/2$ to the second-eye channel and a second time shift of $(\tau_1 \ \tau_2)/2$ to the first-eye channel.

7. The stereoscopic video signal processor of claim 5, wherein the third and fourth frame sequences have a frame rate different from that of the first and second frame sequences, the converter arranged to perform the time interpolation being part of a frame rate converter.

8. The stereoscopic video signal processor as claimed in claim 5, wherein the relative time shift of $\tau_2-\tau_1$ is determined based on the detected first time offset $\tau_1$ and a predetermined value of the second time offset $\tau_2$.

* * * * *